(12) United States Patent
Zhou et al.

(10) Patent No.: US 9,956,506 B2
(45) Date of Patent: May 1, 2018

(54) OIL-GAS SEPARATION CYLINDER, AN OIL-GAS SEPARATION DEVICE AND AN OIL CHROMATOGRAPHY

(71) Applicants: XJ GROUP CORPORATION, Xuchang (CN); XJ ELECTRIC CO., LTD, Xuchang (CN); XUCHANG XJ SOFTWARE TECHNOLOGIES LTD, Xuchang (CN); STATE GRID CORPORATION OF CHINA, Beijing (CN)

(72) Inventors: Shuibin Zhou, Xuchang (CN); Yishi Zhuang, Xuchang (CN); Weijie Wang, Xuchang (CN); Shenghui Wang, Xuchang (CN); Hongwei He, Xuchang (CN); Chang Liu, Xuchang (CN); Qiuhua Shao, Xuchang (CN); Guanghui Lu, Xuchang (CN); Mingchao Yong, Xuchang (CN); Sheng Lu, Xuchang (CN); Guoyu Wang, Xuchang (CN); Dongwu Gong, Xuchang (CN); Jiqing Mu, Xuchang (CN); Wumin Liang, Xuchang (CN); Jianyong Liu, Xuchang (CN)

(73) Assignees: XJ GROUP CORPORATION, Xuchang (CN); STATE GRID CORPORATION OF CHINA, Beijing (CN)

( * ) Notice: Subject to any disclaimer, the term of this patent is extended or adjusted under 35 U.S.C. 154(b) by 250 days.

(21) Appl. No.: 15/076,610

(22) Filed: Mar. 21, 2016

(65) Prior Publication Data
US 2017/0050123 A1 Feb. 23, 2017

(30) Foreign Application Priority Data
Aug. 21, 2015 (CN) .......................... 2015 1 0517234

(51) Int. Cl.
*B01D 19/00* (2006.01)
*B01D 15/12* (2006.01)

(52) U.S. Cl.
CPC ......... *B01D 19/0036* (2013.01); *B01D 15/12* (2013.01); *B01D 19/0042* (2013.01)

(58) Field of Classification Search
CPC .... E21B 49/087–49/088; E21B 21/002; E21B 21/06–21/07; B01D 19/00–19/0495; B01D 15/00–15/428
(Continued)

(56) References Cited

U.S. PATENT DOCUMENTS

2015/0198039 A1* 7/2015 Marshall ............... E21B 49/086
73/152.42

\* cited by examiner

*Primary Examiner* — T. Bennett McKenzie
(74) *Attorney, Agent, or Firm* — CBM Patent Consulting, LLC

(57) ABSTRACT

The present invention discloses an oil-gas separation cylinder, an oil-gas separation device and an oil chromatography. The oil-gas separation cylinder comprises an oil-gas separation cylinder body of which axe extends in direction of up and down, a separating block which separates the oil-gas separation cylinder body into an upper cavity and a lower cavity, an oil-gas separation cylinder piston movably installed in the lower cavity, an oil inlet passage and an oil outlet passage, and an oil-gas separation cylinder vent arranged at upper end of the upper cavity, wherein both of the oil inlet passage and the oil outlet passage are communicated with the upper cavity, wherein the separating block is provided with a guiding hole and a spaying hole used to communicate the upper cavity to the lower cavity, or the separating block is provided with a spaying hole guiding oil used to communicate the upper cavity to the lower cavity. By motion of an oil-gas separation cylinder piston, oil is spayed so as to rapidly realize equilibrium of oil and gas.

(Continued)

Deaerating space is dynamically expanded so as to strengthen deaerating effect. The present invention adopts vacuum spraying method, but eliminates a mixer motor which continuously stirs the oil. Thus, structure of the oil-gas separation device is simplified.

8 Claims, 4 Drawing Sheets

(58) Field of Classification Search
USPC .............................. 95/241–266; 96/155–220
See application file for complete search history.

OIL-GAS SEPARATION CYLINDER, AN OIL-GAS SEPARATION DEVICE AND AN OIL CHROMATOGRAPHY

TECHNICAL FIELD

The present invention generally relates to the field of transformer detection of electric system, in particular to an oil-gas separation cylinder, an oil-gas separation device and an oil chromatography.

BACKGROUND

At present, a oil chromatography detection device of transformer mainly adopts overall design of machine cabinet pattern. That is, all valve body and electrical elements of the oil chromatographic detection device are arranged in the machine cabinet according to structure of the machine cabinet. This design has complex structure and poor capacity of resisting disturbance, demands for a lot of extra resources allocated, wastes resources, demands for large space occupied and is inconvenience in maintenance and installation. Chinese utility model patent document CN201425590Y discloses a vacuum degasser used in online chromatographic analysis for oil of transformer. The vacuum degasser comprises an oil pump, an oil cylinder, a gas cylinder, a deaeration cavity, a mixer motor, and a plenum cavity which is a six-way valve and sample loop. Firstly, by action of the oil cylinder towards one side of the oil cylinder with an oil cylinder rod, the deaeration cavity is expanded, which drives oil in the deaeration cavity flowing into the oil cylinder (a section of the oil cylinder into which the oil flows is called cavity of the oil cylinder) to lower oil level. Then the oil in the deaeration cavity is stirred by a stirrer driven by the mixer motor, which leads to dissolved gas evolving from the oil and realizing new equilibrium of oil and gas. By action of the oil cylinder towards the other side of the oil cylinder without the oil cylinder rod, most of the evolved gas is pushed into the plenum cavity. Then the passage between the deaeration cavity and the plenum cavity is closed. By action of the gas cylinder towards a side of the gas cylinder with gas cylinder rod, evolved gas retained in the passage is pushed into the plenum cavity. So gas transfer and compression is implemented. Gas preserved in the plenum cavity is available for injection analysis of the online chromatographic analysis. However, oil-gas separation achieved by means of stirring takes more time and has poor effect. And due to using the mixer motor and the deaeration cavity, an oil-gas separation device is complex in structure and takes large space.

SUMMARY

The present invention provides an oil-gas separation cylinder with simple structure. Also, the present invention provides an oil-gas separation device using the oil-gas separation cylinder and an oil chromatography.

To overcome above problem, the present invention is implemented by an oil-gas separation cylinder comprising an oil-gas separation cylinder body of which axe extends in direction of up and down, a separating block which separates the oil-gas separation cylinder body into an upper cavity and a lower cavity, an oil-gas separation cylinder piston movably installed in the lower cavity, an oil inlet passage and an oil outlet passage both communicated with the upper cavity, and an oil-gas separation cylinder vent arranged at upper end of the upper cavity, wherein the separating block is provided with a guiding hole and a spaying hole used to communicate the upper cavity to the lower cavity, or the separating block is provided with a spaying hole guiding oil used to communicate the upper cavity to the lower cavity.

Preferably, the oil-gas separation cylinder body with separation structure comprises an upper cylinder body and a lower cylinder body, both of which are fixed on the separating block, and both of the oil inlet passage and the oil outlet passage are arranged at the separating block.

Preferably, an oil returning tube installed onto the separating block extends upward to the upper cavity, an oil returning tube inlet arranged at upper end of the oil returning tube is communicated with interior of the oil returning tube, and an oil returning passage arranged at the separating block is communicated with the oil returning tube to deliver oil in the oil returning tube out through the upper cavity.

Preferably, the oil returning passage is communicated with the oil outlet passage to deliver the oil in the oil returning tube out through the upper cavity.

To overcome above problem, the present invention is also implemented by an oil-gas separation device comprising an oil-gas separation cylinder and a plenum cylinder. The oil-gas separation cylinder comprises an oil-gas separation cylinder body of which axe extends in direction of up and down, a separating block which separates the oil-gas separation cylinder body into an upper cavity and a lower cavity, an oil-gas separation cylinder piston movably installed in the lower cavity, an oil inlet passage and an oil outlet passage both communicated with the upper cavity, and an oil-gas separation cylinder vent arranged at upper end of the upper cavity, wherein the separating block is provided with a guiding hole and a spaying hole used to communicate the upper cavity to the lower cavity, or the separating block is provided with a spaying hole guiding oil used to communicate the upper cavity to the lower cavity. The plenum cylinder comprises a plenum cylinder body, a plenum cylinder piston arranged in the plenum cylinder body, a plenum cavity enclosed by the plenum cylinder piston and the upper section of the plenum cylinder body for gathering gas, a plenum cylinder inlet and a plenum cylinder outlet both arranged at the plenum cylinder body and communicated with the plenum cavity, wherein the plenum cylinder inlet is communicated with the oil-gas separation cylinder vent.

Preferably, the oil-gas separation cylinder body with separation structure comprises an upper cylinder body and a lower cylinder body, both of which are fixed on the separating block; both of the oil inlet passage and the oil outlet passage are arranged at the separating block.

Preferably, an oil returning tube installed onto the separating block extends upward to the upper cavity, an oil returning tube inlet arranged at upper end of the oil returning tube is communicated with interior of the oil returning tube, and an oil returning passage arranged at the separating block is communicated with the oil returning tube to deliver oil in the oil returning tube out through the upper cavity.

Preferably, the oil returning passage is communicated with the oil outlet passage to deliver the oil in the oil returning tube out through the upper cavity.

To overcome above problem, the present invention is also implemented by: an oil chromatography comprising an oil extraction and oil-gas separation layer for transformer and a gas analysis and diagnosis layer for transformer fault, wherein the oil extraction and oil-gas separation layer comprises the oil-gas separation device.

The advantages of the present invention are as follows.

When the oil-gas separation cylinder piston moves downwards and the oil-gas separation cylinder exhaust valve is certainly closed, oil flows into the lower cavity through the guiding hole and the spaying hole or through the spaying hole guiding oil, so that the oil level in the upper cavity drops and a certain degree of vacuum is formed in upper space of the upper cavity; when the oil-gas separation cylinder piston moves upwards and oil in the lower cavity is upwardly spayed by the spaying hole or the spaying hole guiding oil so as to rapidly realize equilibrium of oil and gas. Deaerating space is dynamically expanded so as to strengthen deaerating effect. The present invention adopts vacuum spraying method, but eliminates a mixer motor which continuously stirs the oil. Thus, structure of the oil-gas separation device is simplified.

DETAILED DESCRIPTION

Figure 1:
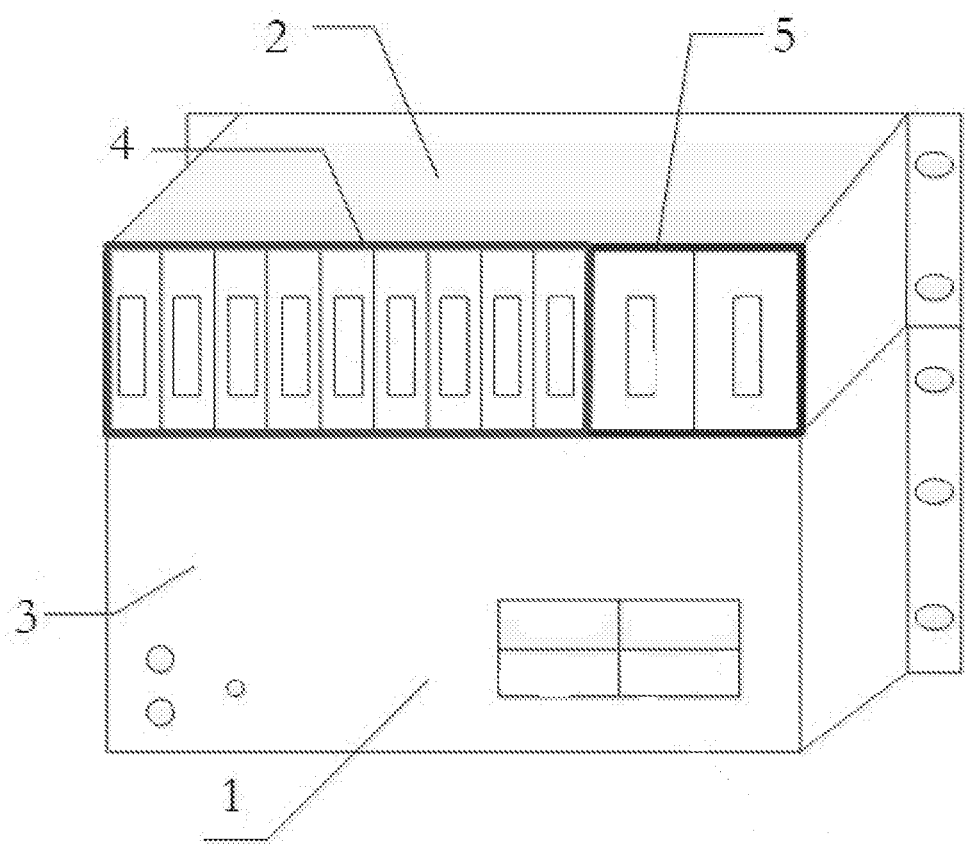
FIG. 1 is a schematic structure view of one embodiment of an oil chromatography of the present invention.

As shown in FIG. 1, an oil chromatography comprises an oil extraction and oil-gas separation layer 1 for transformer and a gas analysis and diagnosis layer for transformer fault 2. The oil extraction and oil-gas separation layer 1 comprises an oil-gas separation module 3, a chromatographic column and a semiconductor detector; the gas analysis and diagnosis layer 2 comprises a fault analysis module 4 and a power module 5, wherein the fault analysis module 4 comprises a CPU plug-in responsible for communicating, analyzing fault and saving data, three output plug-ins responsible for controlling each unit, an extensive plug-in responsible for extending power output, a DC plug-in responsible for collecting DC signal, and a collective plug-in responsible for processing DC signal and sending DC signal to the CPU plug-in through bus. The fault analysis module 4 is designed based on VLD visual programming control concept to implement visualization management of whole life cycle of equipment. The power module 5 is designed based on design concept of isolating power supply and output power to effectively isolate power supply circuit and operating circuit, so that electromagnetic interference introduced in process of operation is avoided and capability of electromagnetic compatibility of equipment is increased. The oil-gas separation module 3 is based on concept of vacuum degassing deaeration which is dynamically expanded. With deaeration section being made into cylinder, deaeration is repeatedly carried out in dynamic spaying, so that the deaeration rate is strengthened and deaeration time is shortened. In the present invention, the oil chromatography is divided into two layers and into three modules according to function. Mechanical motion and electrical test are completely isolated, which spatially avoids noise caused by mechanical motion interfering electrical analysis.

Figure 2:
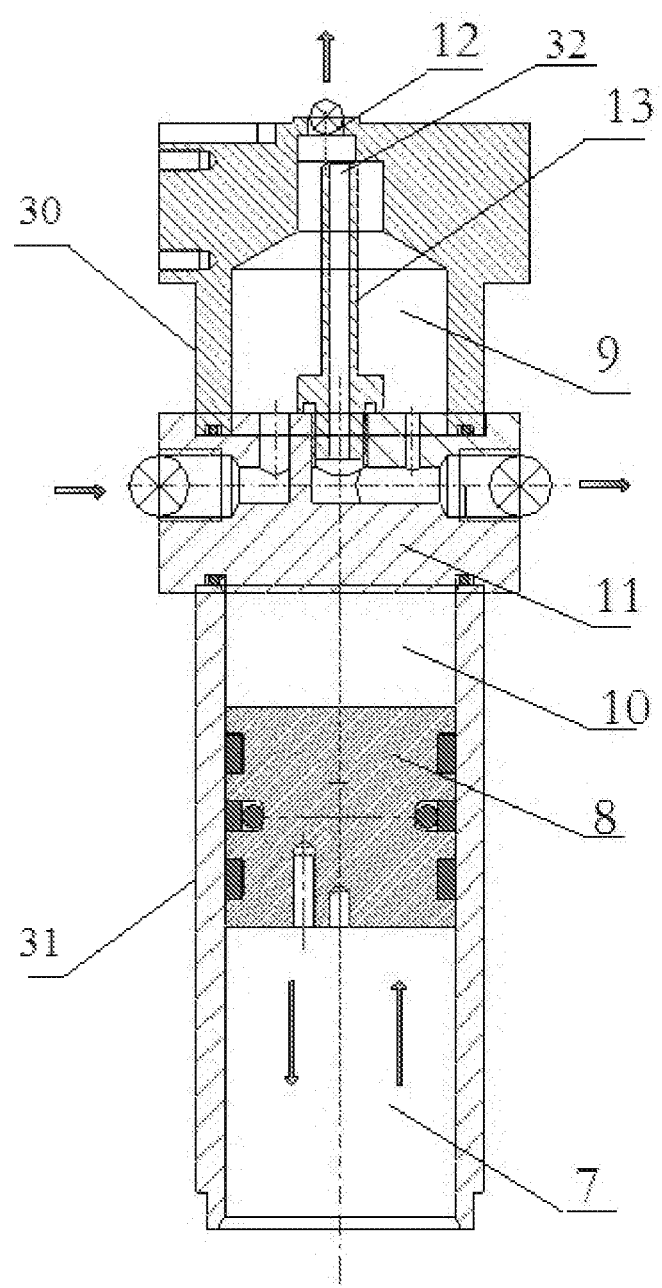
FIG. 2 is a schematic structure view of an oil-gas separation cylinder.
Figure 3:
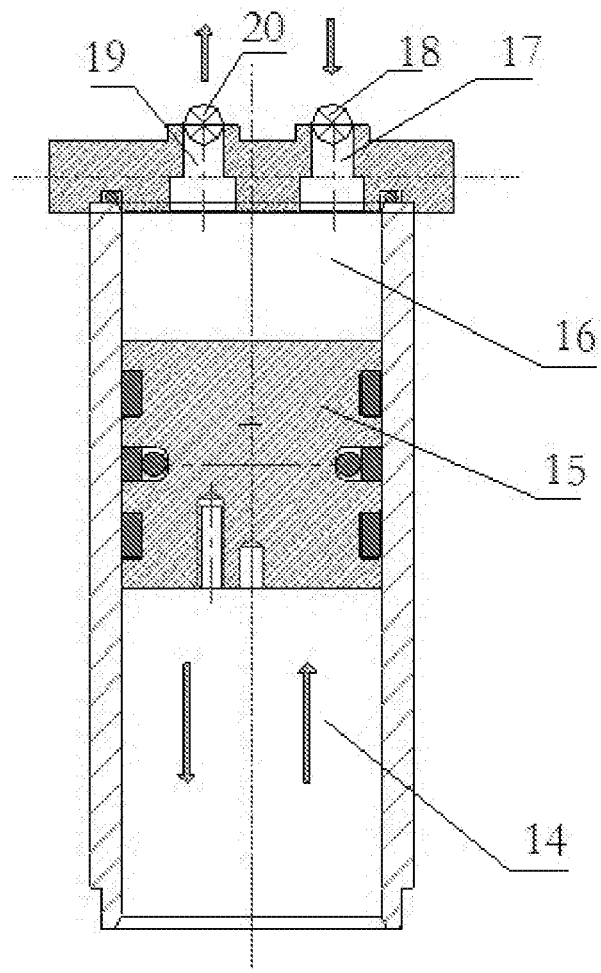
FIG. 3 is a schematic structure view of a plenum cavity.
Figure 4:
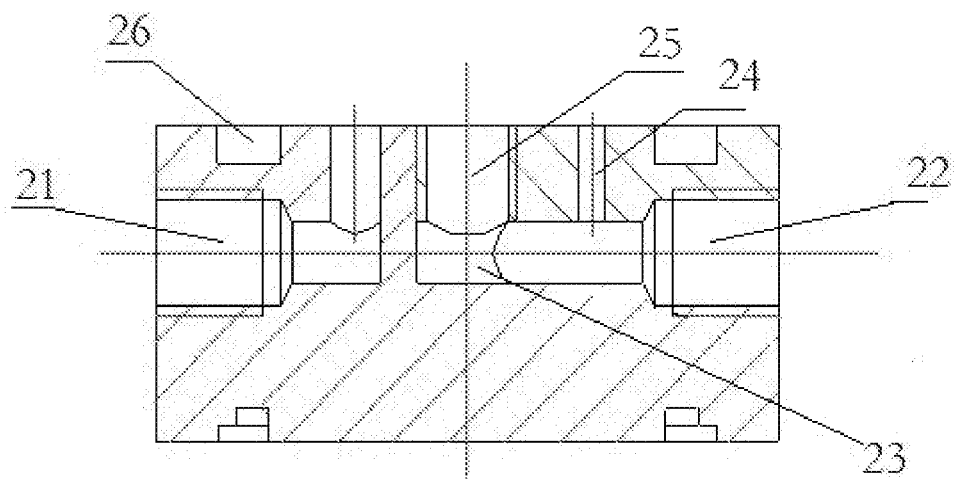
FIG. 4 is a schematic structure view of a separating block.
Figure 5:
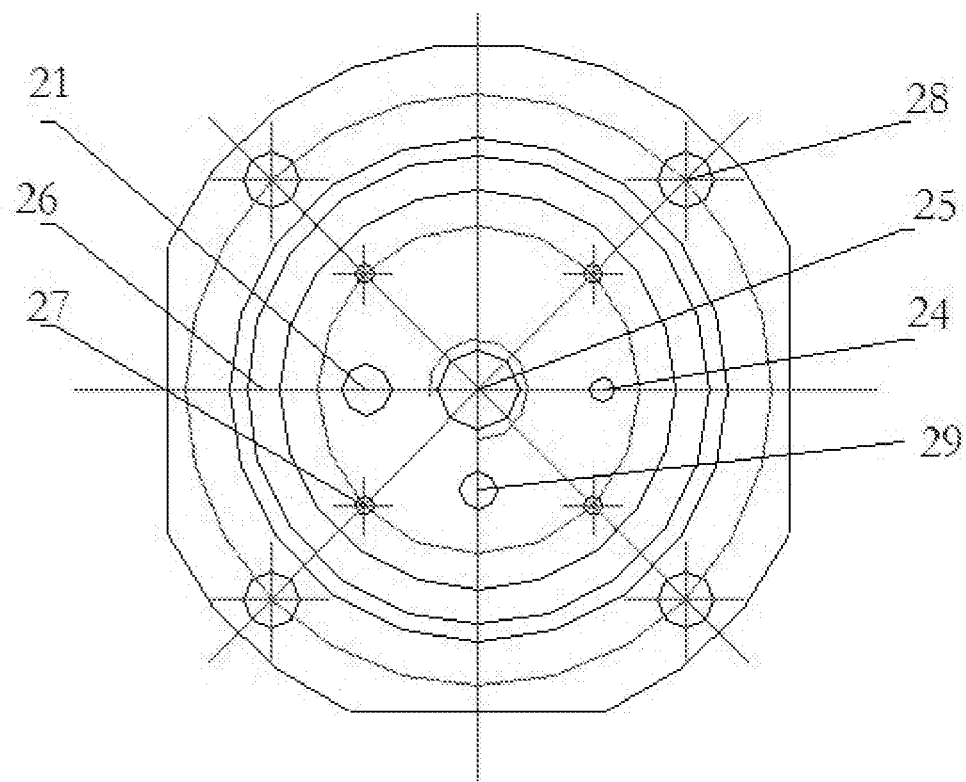
FIG. 5 is the top view of FIG. 1.

The oil-gas separation module 3 comprises an oil-gas separation device comprising an oil-gas separation cylinder 7 and a plenum cylinder 14. As shown in FIG. 2, the oil-gas separation cylinder 7 comprises an oil-gas separation cylinder body, a separating block 11 and an oil-gas separation cylinder piston 8. The oil-gas separation cylinder body with separation structure comprises an upper cylinder body 30 and a lower cylinder body 31, both of which are fixed on the separating block 11. As shown in FIG. 4 and FIG. 5, a cavity of the oil-gas separation cylinder body is separated into an upper cavity 9 and a lower cavity 10 by the separating block 11. The oil-gas separation cylinder piston 8 is movably installed in the lower cavity 10. The separating block 11 comprises an oil inlet passage 21 provided for delivering oil inside the transformer into the upper cavity 9 of the oil-gas separation cylinder 7, an oil outlet passage 22 provided for feeding back separated oil to the transformer, a drainback passage 24, a spay hole guiding oil 27 which runs through the separating block 11 and extends in direction of up and down along axis of the separating block, a mounting hole 25 of which an oil returning tube 13 is installed in which is used to feedback excessive oil in the upper cavity 9 to the transformer, a fixing hole 28 solidly connecting with the upper cavity and the lower cavity, a pressure testing and releasing hole 29, and an annular seal groove 26. The upper end of the upper cavity 9 is provided with an oil-gas separation cylinder vent 12 provided for draining gas and provided with an oil-gas separation cylinder exhaust valve. The oil-gas separation device also comprises the plenum cylinder 14 provided for collecting gas. As shown in FIG. 3, the plenum cylinder 14 comprises a plenum cylinder piston 15, a plenum cavity 16, and a plenum cylinder inlet 17 and a plenum cylinder outlet 19, wherein both of the plenum cylinder inlet 17 and the plenum cylinder outlet 19 are arranged at upper end of the plenum cylinder 14 and is communicated with the plenum cylinder 14, a plenum cylinder inlet valve 18 is arranged in the plenum cylinder inlet 17, a plenum cylinder outlet valve 20 is arranged in the plenum cylinder outlet 19, the plenum cylinder inlet 17 is communicated with the oil-gas separation cylinder vent 12. Thus gas separated by the oil-gas separation cylinder 7 is gathered. The separating block 11 is a core component of the oil-separation cylinder 7 for deaeration and has a role in protection during oil-gas separation. During oil extraction, oil-gas separation cylinder piston 8 is set up at top of the upper cavity 9, and the oil is pumped into the upper cavity 9 by an oil pump through the oil inlet passage 21. The oil inlet passage 21 is closed until oil level reaches certain position. Vacuum spraying deaeration which is dynamically expanded is realized by reciprocating motion of the oil-gas separation cylinder piston 8 combining with the separating block 11. When the oil-gas separation cylinder piston 8 moves downwards and the oil-gas separation cylinder exhaust valve is certainly closed, the oil level in the upper cavity 9 drops and a certain degree of vacuum is formed in upper space of the upper cavity 9; when the oil-gas separation cylinder piston 8 moves upwards, the spaying hole guiding oil 27 of the separating block 11 spays oil and gas. Deaerating space is dynamically expanded so as to strengthen deaerating effect. An oil returning tube 13 installed onto the separating block 11 extends upward to the upper cavity, an oil returning tube inlet 32 arranged at upper end of the oil returning tube 13 is communicated with interior of the oil returning tube 13, and an oil returning passage 23 arranged at the separating block 11 is communicated with the oil returning tube 13 to deliver the oil in the oil returning tube out through the upper cavity 9. Furthermore, an oil returning passage 23 is communicated with the oil outlet passage 22. Thus, excessive oil in the upper cavity 9 will flow into the oil returning tube 13 to prevent the excessive oil from flowing into the plenum cavity of the plenum cylinder 14 through oil-gas separation cylinder vent 12, if pressure in the oil-separation cylinder 7 is large. During the reciprocating motion of the oil-gas separation cylinder piston 8, the oil flows into the oil-gas separation cylinder body through the spaying hole guiding oil 27 when the oil-gas separation cylinder piston 8 moving downwards and the oil is upwardly spayed by the spaying hole guiding oil 27 under pressure in the oil-gas separation cylinder body so as to rapidly realize deaerating balance when the oil-gas separation cylinder piston 8 moving upwards. When oil and gas circulates, the oil in the upper cavity 9 and the oil returning tube 13 flows back into the transformer.

When the plenum cylinder piston 15 moves downwards and the plenum cylinder inlet valve 18 and the plenum cylinder outlet valve 20 is certainly closed, a certain degree of vacuum is formed in the plenum cavity 16. Then the plenum cylinder inlet valve 18 is opened, so that gas separated by the oil-separation cylinder 7 is gathered to reach a certain gas input. Finally, quota-sampling for plenum cylinder body is implemented, sampling step achieved by multi-ported valve is canceled, gas circuit is simplified, and sampling efficiency is improved.

The oil-separation device of the present invention with double cylinder for deaeration (including the oil-separation cylinder and the plenum cylinder) at least has the beneficial effect of: (1) reducing volume of oil extracted, using space of oil-gas separation cylinder body reasonably, implementing repeated deaeration, and increasing deaerating efficiency in unit volume; (2) simplifying connecting circuits between oil circuits and gas circuits; (3) improving sampling mode, cancelling sampling step achieved by multi-ported valve, implementing quota-sampling by using effective volume of the plenum cylinder, and implementing the simplest design for the gas circuits; and (4) saving cost, allowing easy maintenance and increasing space utilization.

Adopting modularized distributed design for physical design and plug-in design for different functionalities, the present invention improves the ability of isolation protection, can greatly improve portability and safety reliability of the equipment, is advantageous for resource integration and intensive management for a substation, and reduces resource waste caused by maintenance. Installation and maintenance based on modular approach improves configuration flexibility, is more suitable for constructing a mobile substation, and guarantees resource integration for an intelligent substation.

In other embodiment of the present invention, the oil-gas separation cylinder body is adopted with integrative structure, where the separating block is installed and the oil inlet passage and the oil outlet passage are arranged. The oil returning passage and the oil returning tube may not be applied, when pressure in the oil-gas separation cylinder is normal. The oil returning passage may be disconnected with the oil outlet passage, but a single oil returning and outlet passage is applied instead. The plenum cylinder inlet and the plenum cylinder outlet may not be arranged at the upper end of the plenum cylinder, but on a side wall of the plenum cavity of the plenum cylinder body instead. The spaying hole guiding oil of the separating block may comprise a guiding hole and a spaying hole, wherein an one-way valve is arranged in the guiding hole for the oil flowing from the upper cavity into the lower cavity and a spay tube which extends in the direction of up and down is arranged in the spaying hole.

The oil-gas separation device in this embodiment is implemented in same way as above embodiments of the oil chromatography and need not be repeated here.

The oil-gas separation cylinder in this embodiment is implemented in same way as above embodiments of the oil chromatography and need not be repeated here.

Although the embodiments of the present invention have been disclosed above, but it is not limited to the applications set forth in the specification and embodiments, and can be applied to various fields suitable for the present invention. For those skilled in the art, other modifications may be easily achieved without departing the general concept defined by the claims and their equivalent. The present invention is not limited to particular details and illustrations shown and described herein.

What is claimed is:

1. An oil-gas separation cylinder comprising:
   an oil-gas separation cylinder body of which axe extends in a vertical direction;
   a separating block which separates the oil-gas separation cylinder body into an upper cavity and a lower cavity;
   an oil-gas separation cylinder piston movably installed in the lower cavity;
   an oil inlet passage and an oil outlet passage, both of which are communicated with the upper cavity; and
   an oil-gas separation cylinder vent arranged at upper end of the upper cavity;
   wherein the separating block is provided with a guiding hole and a spaying hole used to communicate the upper cavity to the lower cavity, or the separating block is provided with a spaying hole guiding oil used to communicate the upper cavity to the lower cavity.

2. The oil-gas separation cylinder of claim 1, wherein the oil-gas separation cylinder body further comprises: an upper cylinder body and a lower cylinder body, both of which are fixed on the separating block; both of the oil inlet passage and the oil outlet passage are arranged at the separating block.

3. The oil-gas separation cylinder of claim 1, comprising:
   an oil returning tube installed onto the separating block extending upward to the upper cavity;
   an oil returning tube inlet arranged at upper end of the oil returning tube communicating with interior of the oil returning tube; and
   an oil returning passage arranged at the separating block communicating with the oil returning tube to deliver oil in the oil returning tube out through the upper cavity.

4. The oil-gas separation cylinder of claim 3, wherein the oil returning passage is communicated with the oil outlet passage to deliver the oil in the oil returning tube out through the upper cavity.

5. An oil-gas separation device comprising:
   an oil-gas separation cylinder, and
   a plenum cylinder;
   wherein the oil-gas separation cylinder further comprising:
   an oil-gas separation cylinder body of which axe extends in direction of up and down;
   a separating block which separates the oil-gas separation cylinder body into an upper cavity and a lower cavity;
   an oil-gas separation cylinder piston movably installed in the lower cavity; an oil inlet passage and an oil outlet passage, both of which are communicated with the upper cavity; and
   an oil-gas separation cylinder vent arranged at upper end of the upper cavity;
   wherein the separating block is provided with a guiding hole and a spaying hole used to communicate the upper cavity to the lower cavity, or the separating block is provided with a spaying hole guiding oil used to communicate the upper cavity to the lower cavity;
   wherein the plenum cylinder further comprising:
   a plenum cylinder body;
   a plenum cylinder piston arranged in the plenum cylinder body;

a plenum cavity enclosed by the plenum cylinder piston and the upper section of the plenum cylinder body for gathering gas;

a plenum cylinder inlet and a plenum cylinder outlet, both of which are arranged at the plenum cylinder body and communicated with the plenum cavity;

wherein the plenum cylinder inlet is communicated with the oil-gas separation cylinder vent.

6. The oil-gas separation device of claim 5, wherein the oil-gas separation cylinder body with separation structure comprises an upper cylinder body and a lower cylinder body, both of which are fixed on the separating block; both of the oil inlet passage and the oil outlet passage are arranged at the separating block.

7. The oil-gas separation device of claim 5, further comprising:

an oil returning tube installed onto the separating block extending upward to the upper cavity;

an oil returning tube inlet arranged at upper end of the oil returning tube communicating with interior of the oil returning tube;

an oil returning passage arranged at the separating block communicating with the oil returning tube to deliver oil in the oil returning tube out through the upper cavity.

8. The oil-gas separation device of claim 7, wherein the oil returning passage is communicated with the oil outlet passage to deliver the oil in the oil returning tube out through the upper cavity.

* * * * *